United States Patent [19]

Destryker et al.

[11] Patent Number: 5,202,060
[45] Date of Patent: Apr. 13, 1993

US005202060A

[54] COMPOSITIONS OF ELECTRICALLY CONDUCTIVE POLYMERS DERIVED FROM PYRROLE, SUBSTITUTED OR OTHERWISE, PROCESS FOR OBTAINING THEM AND USE OF THESE COMPOSITIONS

[75] Inventors: Elise Destryker, Sint-Pieters-Leeuw; Etienne Hannecart, Tervuren, both of Belgium

[73] Assignee: Solvay S.A., Brussels, Belgium

[21] Appl. No.: 732,220

[22] Filed: Jul. 19, 1991

[30] Foreign Application Priority Data

Jul. 31, 1990 [BE] Belgium .............................. 09000760

[51] Int. Cl.$^5$ .............................................. H01B 1/14
[52] U.S. Cl. ................................... 252/500; 252/518; 204/291; 429/42; 429/219; 526/528; 528/423
[58] Field of Search ................ 252/500, 518; 526/258; 528/423; 204/291; 429/42, 219

[56] References Cited

U.S. PATENT DOCUMENTS

| | | | |
|---|---|---|---|
| 4,604,427 | 8/1986 | Roberts et al. | 252/500 |
| 4,696,835 | 9/1987 | Maus et al. | 252/500 |
| 4,697,000 | 9/1987 | Witucki et al. | 252/500 |
| 4,697,001 | 9/1987 | Walker et al. | 252/500 |
| 4,803,096 | 2/1989 | Kuhn et al. | 252/500 |

FOREIGN PATENT DOCUMENTS 0267392  5/1988  European Pat. Off. .
1-1170615 7/1989  Japan .

*Primary Examiner*—Karl Group
*Assistant Examiner*—Anthony J. Green
*Attorney, Agent, or Firm*—Spencer, Frank & Schneider

[57] ABSTRACT

The invention relates to a composition comprising an electrically conductive polymer chosen from polypyrrole and/or substituted polypyrrole, a vanadium compound and an anion.

The invention also relates to a process for obtaining this composition and to the uses of this composition.

16 Claims, No Drawings

COMPOSITIONS OF ELECTRICALLY CONDUCTIVE POLYMERS DERIVED FROM PYRROLE, SUBSTITUTED OR OTHERWISE, PROCESS FOR OBTAINING THEM AND USE OF THESE COMPOSITIONS

The present invention relates to compositions of electrically conductive polymers derived from substituted or unsubstituted pyrrole polymers, containing at least one vanadium compound and an anion. The invention also relates to a process for the preparation of these compositions by chemical polymerisation of pyrrole and/or of substituted pyrrole in the presence of a vanadium compound as oxidising agent and of an acid yielding the anion.

In Patent Application JP 87/331,022 (Nitto Denko Corp.), a process has been proposed for the preparation of electrically conductive polymers based on pyrrole by chemical polymerisation of pyrrole in the presence of an oxidising agent such as especially $H_2O_2$, $PbO_2$ or $MnO_2$ and of a protonic acid such as especially HCl or $H_2SO_4$.

However, some electrical applications such as the production of electrochemical storage systems of the capacitor or condenser type with a high energy density and a high cycling number, require conductive polymers with special properties exhibiting highly developed morphologies.

These special properties are especially a high energy per unit mass and unit volume for uses in energy sources feeding portable systems, and a good resistance of the polymer to aging over a wide range of temperature and of storage conditions.

The highly developed morphology, for its part, is characterised especially by a high specific surface. These properties enable these conductive polymers to be used particularly in the manufacture of leaflet batteries.

Furthermore, the composition containing the conductive polymers exhibits a high conductivity, and this widens its potential applications.

The present invention is aimed at providing new compositions of electrically conductive polymers based on pyrrole, which exhibit the abovementioned special properties.

For this purpose the invention relates to a composition comprising an electrically conductive polymer chosen from polypyrrole and/or substituted polypyrrole, a vanadium compound and an anion. A vanadium compound is intended to mean any vanadium derivative capable of generating vanadium oxides.

Vanadium oxides are intended to mean any vanadium oxides of any valency, 2, 3, 4 or 5.

Vanadium pentoxide is usually employed in the compositions of the invention. Any other vanadium compound such as vanadium trioxide, vanadium trisulphate, vanadium oxydichloride, vanadium oxysulphate or vanadium oxytrichloride, which is capable of generating vanadium pentoxide chemically may, however, also be employed.

A polypyrrole and/or substituted polypyrrole is intended to mean any polymers originating from pyrrole and/or substituted pyrroles, that is to say homopolymers and copolymers containing pyrrole or substituted pyrrole units. Pyrroles substituted in the 3, or 3 and 4, positions and N-methylpyrrole are usually understood to be included among the substituted pyrroles. The best results have been obtained with unsubstituted pyrrole.

The compositions according to the invention usually contain 0.1 to 99% of vanadium oxide by weight of the composition, and preferably 1 to 98% and particularly preferably 5 to 95%.

The compositions according to the invention generally also contain at least one anion of organic or inorganic origin. They generally contain, as an anion of inorganic origin, a chloride, a sulphate or a nitrate and, as an anion of organic origin, a carboxylate, a phosphate, a phosphonate, an organic sulphate, an organic sulphonate, an alkyl sulphate, an alkylaryl sulphate, an alkylsulphonate or an alkylarylsulphonate. As an anion of inorganic origin they usually contain a chloride and, as an anion of organic origin, a carboxylate such as a laurate, an acetate, a trichloroacetate, a trifluoroacetate, a phosphate such as a 2-glycerol phosphate, a phosphonate such as a phenylphosphonate, a sulphate such as a lauryl sulphate, a dodecyl sulphate, an octyl sulphate, an ethylhexyl sulphate, a sulphonate such as a p-toluenesulphonate, a pentadecylsulphonate, a hexadecylsulphonate, a dodecylbenzenesulphonate, a polyvinyl sulphonate, a polystyrenesulphonate, a trifluoromethanesulphonate, a methanesulphonate, a dodecylsulphonate, an octanesulphonate, a butylsulphonate, a hexylsulphonate or an ethylsulphonate.

The compositions according to the invention may contain one of these anions or a mixture of two or more of these anions. They preferably contain at least, as an anion of inorganic origin, the chloride and, as an anion of organic origin, the octanesulphonate, the p-toluenesulphonate, the butylsulphonate, the methylsulphonate or the trifluoromethanesulphonate.

The specific surface area of the compositions according to the invention is usually greater than 5 $m^2/g$ and is preferably greater than 10 $m^2/g$.

The present invention also relates to a process for the preparation of the compositions according to the invention.

To this end, the invention relates to a process for the preparation of a composition comprising an electrically conductive polymer chosen from polypyrrole and/or substituted polypyrrole, by chemical polymerisation of pyrrole and/or of substituted pyrrole in an aqueous reaction mixture comprising a vanadium oxide as oxidising agent and an acid.

0.10 to 50 moles of the vanadium compound are generally used per mole of pyrrole and/or of substituted pyrrole, usually 0.50 to 35 moles and preferably 0.75 to 25 moles.

At least one acid is also usually employed in the reaction mixture. An organic or inorganic acid is generally used. The inorganic acid used is usually hydrochloric acid and the organic acid a carboxylic acid, a phosphonic acid or a sulphonic acid. The organic acid usually employed is a carboxylic acid such as an acid whose anion is a laurate, an acetate, a trichloroacetate or a trifluoroacetate, a phosphonic acid such as an acid whose anion is a phenylphosphonate, a sulphonic acid such as an acid whose anion is a p-toluenesulphonate, a pentadecylsulphonate, a hexadecylsulphonate, a dodecylbenzenesulphonate, a polyvinyl sulphonate, a polystyrenesulphonate, a trifluoromethanesulphonate, a methanesulphonate, a dodecylsulphonate, an octanesulphonate, a butylsulphonate, a hexylsulphonate or an ethylsulphonate. One or more of these acids is generally used. Hydrochloric acid, p-toluenesulphonic acid, trifluoromethanesulphonic acid, octanesulphonic acid, butylsulphonic acid and methylsulphonic acid are preferably used.

Independently of the presence of the abovementioned acid, the reaction mixture may also contain a salt. The salt used is a salt of organic origin or a salt of inorganic origin. The salts corresponding to the anions present in the composition according to the invention or to the acids introduced into the reaction mixture used in the process according to the invention are generally used, as also are the salts containing a phosphate such as a 2-glycerol phosphate, a sulphate such as a lauryl sulphate, a dodecyl sulphate, an octyl sulphate or an ethylhexyl sulphate.

0.5 to 20 moles of acid are generally used per mole of pyrrole and/or of substituted pyrrole. Good results have been obtained with concentrations of between 1 and 10 moles of acid per mole of pyrrole and/or of substituted pyrrole.

The process according to the invention can be carried out in the absence of salt. However, the process is advantageously carried out in the presence of salt.

0.01 to 20 moles of salt are generally used per mole of pyrrole and/or substituted pyrrole. Good results have been obtained with concentrations of between 0.1 and 10 moles of salt per mole of pyrrole and/or of substituted pyrrole.

The process according to the invention is preferably carried out in an aqueous mixture, but the quantity of water which is needed may vary within wide limits and depends essentially on the nature of the other components used.

The temperature at which the process is carried out is generally between 0° and 50° C. and preferably between 5° and 40° C. when the operation is carried out at atmospheric pressure.

The pressure at which the process is carried out is not critical per se. It is generally between 0.1 and 10 bars and preferably equal to atmospheric pressure.

The process according to the invention may be carried out in any apparatus or any reactor which makes it possible to combine the operating conditions described above.

The compositions of the invention may be employed for their electrical conductivity, electromagnetic absorption and thermal conductivity properties and more particularly for producing electroconductive devices.

The composition comprising an electrically conductive polymer according to the invention can then be doped with cations or anions during the charging or discharging of the system, the cations or the anions originate from the electrolyte. However, some anions can also originate from the composition itself.

The electrolytes are generally chosen from the conductive salts of formula $C^+A^-$ in which $C^+$ is a cation and in which $A^-$ is an anion.

The cation $C^+$ is usually chosen from ammonium, alkaline-earth metal or alkali metal ions, the ions $R_4N^+$ and $R_4P^+$ (R being an alkyl radical such as the ethyl and butyl radicals, for example) and preferably from $Li^+$, $Na^+$ or $K^+$ cations or complex ions such as $(Bu)_4N^+$ or $(Et)_4N^+$, preferably used in the form of $LiClO_4$, $KPF_6$, $(Bu)_4NClO_4$ and $(Et)_4NClO_4$ in solution in a solvent such as acetonitrile, tetrahydrofuran or propylene carbonate.

The anion $A^-$ is chosen from the $ClO_4^-$, $AsF_6^-$, $SbF_6^-$, $SO_4^{2-}$, $C_6H_5SO_3^-$, $BF_4^-$, $PF_6^-$, $CF_3SO_3^-$, $I_3^-$, $Br^-$ and $NO_3^-$ ions. The best results have been obtained with the $ClO_4^-$ ion.

The compositions according to the invention can advantageously be employed in electrochemical storage systems of the capacitor or condenser type with a high energy density and long cycling period. The condensers consist of two electrodes separated by an electrolyte, at least one of the two electrodes consists of the composition comprising an electrically conductive polymer according to the invention. These electrochemical condensers with a high specific energy may be symmetrical condensers (the two electrodes are identical) or unsymmetrical ones (the two electrodes are different in nature).

In the case of an unsymmetrical condenser the counterelectrode is formed either by a different conductive polymer or by an alkali metal or an insertion compound. The counterelectrode may consist of a p-doped polymer such as especially the other electrically conductive polymers based on polypyrroles, substituted or otherwise, on polythiophenes, substituted or otherwise, on polyacetylene, on polyphenylene or on aniline polymer.

The composition comprising a conductive polymer according to the invention may also be employed in the production of rechargeable batteries, or of an electrical generator, cell or accumulator whose anodes (or cathodes) consist of electrodes consisting of or coated with films formed by these compositions according to the invention, doped with anions (or cations).

The invention is illustrated by the following examples:

EXAMPLE 1

Into a 500-ml 3-necked round bottom flask are introduced, under a nitrogen atmosphere, 5.0 g (0.027 mol) of vanadium oxide $V_2O_5$ and 75 ml of an aqueous solution containing 24.3 g (0.11 mol) of sodium octanesulphonate and 56 ml of 2N hydrochloric acid.

1.5 ml (0.022 mol) of pyrrole is stirred into the reaction mixture thus obtained, at 20° C.

The flask is kept stirred at 20° C. for 2 hours.

The polymer obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum (at 2670 Pa i.e. 20 mm Hg) at 20° C.

2.5 g of a black powder are obtained.

This powder is pressed at 20° C. for a few minutes at a pressure of $19.6 \times 10^7$ Pa (i.e. 2 tons per $cm^2$). The wafer obtained has a conductivity of 19 S $cm^{-1}$.

The specific surface area of the powder is 49 $m^2/g$, its pore volume is 2.85 $cm^3/g$.

The composition comprising the conductive polymer contains 47% of polypyrrole and 19% of vanadium oxide.

The degree of conversion—polymer calculated as undoped/monomer—is approximately 77% by weight.

The elemental composition of the conductive polymer obtained is N/Cl/S: 1/0.14/0.19 gram-atoms.

EXAMPLE 2

9.9 g (0.054 mol) of vanadium oxide $V_2O_5$ and 150 ml of an aqueous solution containing 43 g (0.22 mol) of p-toluenesulphonic acid are introduced under a nitrogen atmosphere into a 500-ml 3-necked round bottom flask.

3 ml (0.044 mol) of pyrrole are stirred into the reaction mixture thus obtained, at 20° C.

The flask is kept stirred at 20° C. for 2 hours.

The polymer obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum (at 2670 Pa i.e. 20 mm Hg) at 20° C.

5.6 g of a black powder are obtained.

This powder is pressed at 20° C. for a few minutes at a pressure of $19.6 \times 10^7$ Pa (i.e. 2 tons per cm$^2$). The wafer obtained has a conductivity of 32 S cm$^{-1}$.

The specific surface area of the powder is 19 m$^2$/g, its pore volume is 1.62 cm$^3$/g.

The composition comprising the conductive polymer contains 47% of polypyrrole and 10% of vanadium oxide.

The degree of conversion—polymer calculated as undoped/monomer—is approximately 87% by weight.

The elemental composition of the conductive polymer obtained is N/Cl/S: 1/-/0.30 gram-atoms.

EXAMPLE 3 R (comparative)

4.7 g (0.054 mol) of MnO$_2$ and 150 ml of 0.9N hydrochloric acid are introduced under a nitrogen atmosphere into a 500-ml 3-necked round bottom flask.

3 ml (0.044 mol) of pyrrole are stirred into the reaction mixture thus obtained, at 20° C.

The flask is kept stirred at 20° C. for 2 hours.

The polymer thus obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum at 20° C.

4.3 g of a black powder are obtained with a degree of conversion—polymer calculated as undoped/monomer—of 42%.

The composition of the powder is 61% of MnO$_2$ and 32% of polypyrrole.

This powder is pressed at 20° C. for a few minutes at a pressure of $19.6 \times 10^7$ Pa (i.e. 2 tons per cm$^2$). The wafer obtained has a conductivity of 0.5 S cm$^{-1}$.

The specific surface area of the powder is 14 m$^2$/g, its pore volume is 0.65 cm$^3$/g.

The elemental composition of the conductive polymer obtained is N/Cl/S: 1/0.28/- gram-atoms.

EXAMPLE 4

9.9 g (0.054 mol) of vanadium oxide V$_2$O$_5$ and 150 ml of an aqueous solution containing 113 ml of 2N hydrochloric acid are introduced under a nitrogen atmosphere into a 500-ml 3-necked round bottom flask.

3 ml (0.045 mol) of pyrrole are stirred into the reaction mixture thus obtained, at 20° C.

The flask is kept stirred at 20° C. for 2 hours.

The polymer obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum at 20° C.

3.6 g of a black powder are obtained.

This powder is pressed at 20° C. for a few minutes at a pressure of $19.6 \times 10^7$ Pa (i.e. 2 tons per cm$^2$). The wafer obtained has a conductivity of 27 S cm$^{-1}$.

The specific surface area of the powder is 38 m$^2$/g, its pore volume is 0.41 cm$^3$/g.

The composition comprising the conductive polymer contains 73% of polypyrrole and 9% of vanadium oxide V$_2$O$_5$.

The degree of conversion—polymer calculated as undoped/monomer—is approximately 88% by weight.

The elemental composition of the conductive polymer obtained is N/Cl/S: 1/0.28/- gram-atoms.

EXAMPLE 5

13.75 g (0.076 mol) of vanadium oxide V$_2$O$_5$ and 250 ml of an aqueous solution containing 60 g (0.375 mol) of sodium butylsulphonate and 62 ml of 6N hydrochloric acid are introduced under a nitrogen atmosphere into a 500-ml 3-necked round bottom flask.

5 ml (0.075 mol) of pyrrole are stirred into the reaction mixture thus obtained, at 20° C.

The flask is kept stirred at 20° C. for 2 hours.

The polymer obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum at 20° C.

6.4 g of a black powder are obtained.

This powder is pressed at 20° C. for a few minutes at a pressure of $19.6 \times 10^7$ Pa (i.e. 2 tons per cm$^2$). The wafer obtained has a conductivity of 51 S cm$^{-1}$.

The specific surface area of the powder is 52 m$^2$/g, its pore volume is 3.30 cm$^3$/g.

The composition comprising the conductive polymer contains 56% of polypyrrole and 15% of vanadium oxide V$_2$O$_5$.

The degree of conversion—polymer calculated as undoped/monomer—is approximately 73% by weight.

The elemental composition of the conductive polymer obtained is N/Cl/S: 1/0.14/0.19 gram-atoms.

EXAMPLE 6

27.5 g (0.15 mol) of vanadium oxide V$_2$O$_5$ and 500 ml of an aqueous solution containing 72 g (0.75 mol) of methylsulphonic acid are introduced under a nitrogen atmosphere into a 1000-ml 3-necked round bottom flask.

10 ml (0.015 mol) of pyrrole are stirred into the reaction mixture thus obtained, at 20° C.

The flask is kept stirred at 20° C. for 2 hours.

The polymer obtained is filtered off under a nitrogen atmosphere and is then washed 3 times with 100 ml of water, 3 times with 100 ml of a 50/50 mixture of water and methanol and then 3 times with 100 ml of methanol.

The polymer is then dried overnight under vacuum at 20° C.

13.2 g of a black powder are obtained.

This powder is pressed at 20° C. for a few minutes at a pressure of $19.6 \times 10^7$ Pa (i.e. 2 tons per cm$^2$). The wafer obtained has a conductivity of 51 S cm$^{-1}$.

The specific surface area of the powder is 25 m$^2$/g, its pore volume is 1.51 cm$^3$/g.

The composition comprising the conductive polymer contains 56% of polypyrrole and 12% of vanadium oxide.

The elemental composition of the conductive polymer obtained is N/Cl/S: 1/-/0.27 gram-atoms.

EXAMPLE 7

3.3 g (0.018 mol) of vanadium oxide V$_2$O$_5$ and 50 ml of an aqueous solution containing 11.3 g (0.075 mol) of trifluoromethanesulphonic acid are introduced under a nitrogen atmosphere into a 500-ml 3-necked round bottom flask.

1 ml (0.015 mol) of pyrrole is stirred into the reaction mixture thus obtained, at 20° C.

The flask is kept stirred at 20° C. for 2 hours.

The polymer obtained is filtered off under a nitrogen atmosphere and is then washed 3 times with 25 ml of water, 3 times with 25 ml of a 50/50 mixture of water and methanol and then 3 times with 25 ml of methanol.

The polymer is then dried overnight under vacuum at 20° C.

1.6 g of a black powder are obtained.

This powder is pressed at 20° C. for a few minutes at a pressure of $19.6 \times 10^7$ pa (i.e. 2 tons per cm$^2$). The wafer obtained has a conductivity of 25 S cm$^{-1}$.

The specific surface area of the powder is 19 m$^2$/g, its pore volume is 1.14 cm$^3$/g.

The composition comprising the conductive polymer contains 53% of polypyrrole and 6% of vanadium oxide.

The elemental composition of the conductive polymer obtained is N/Cl/S: 1/-/0.24 gram-atoms.

The degree of conversion—polymer calculated as undoped/monomer—is approximately 85% by weight.

We claim:

1. A composition comprising an electrically conductive polymer chosen from polypyrrole or substituted polypyrrole, a vanadium compound and an anion.

2. The composition according to claim 1, wherein the vanadium compound is vanadium pentoxide.

3. The composition according to claim 1, wherein the composition has a specific surface area greater than about 5 m$^2$/g.

4. The composition according to claim 2, wherein said anion is chosen from the group consisting of chloride, octanesulphonate, p-toluenesulphonate, butylsulphonate, methylsulphonate and trifluoromethanesulphonate.

5. A process for the preparation of a composition comprising an electrically conductive polymer chosen from polypyrrole or substituted polypyrrole, comprising polymerizing pyrrole or substituted pyrrole in an aqueous reaction mixture comprising a vanadium compound oxidising agent and an acid, and recovering a composition comprising an electrically conductive polymer.

6. The process according to claim 5, wherein the reaction mixture contains vanadium pentoxide as the vanadium compound.

7. The process according to claim 6, wherein the reaction mixture contains at least one salt.

8. The process according to claim 5, wherein the acid used is chosen from hydrochloric acid, p-toluenesulphonic acid, trifluoromethanesulphonic acid, octanesulphonic acid, butylsulphonic acid and methylsulphonic acid.

9. An electrode comprising a composition according to claim 1.

10. An electrode comprising a composition according to claim 2.

11. An electrode comprising a composition according to claim 3.

12. An electrode comprising a composition according to claim 4.

13. In an electrochemical storage device, the improvement comprising an electrode according to claim 9.

14. In an electrochemical storage device the improvement comprising an electrode according to claim 10.

15. In an electrochemical storage device the improvement comprising an electrode according to claim 11.

16. In an electrochemical storage device the improvement comprising an electrode according to claim 12.

* * * * *